(12) United States Patent
Schaerlund et al.

(10) Patent No.: US 7,115,156 B2
(45) Date of Patent: Oct. 3, 2006

(54) AIR FILTER SYSTEM

(75) Inventors: Jukka Schaerlund, Offenbach (DE); Reinhard Oelpke, Harthausen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 162 days.

(21) Appl. No.: 10/800,011

(22) Filed: Mar. 15, 2004

(65) Prior Publication Data

US 2004/0244586 A1    Dec. 9, 2004

(30) Foreign Application Priority Data

Mar. 14, 2003    (DE) ............................... 103 11 640

(51) Int. Cl.
*B01D 45/12* (2006.01)
*B01D 50/00* (2006.01)
*B01D 29/56* (2006.01)
*B01D 35/30* (2006.01)

(52) U.S. Cl. ............................ 95/268; 95/287; 55/321; 55/337; 55/346; 55/385.3; 55/466; 55/478; 55/482; 55/485; 55/498; 55/502; 55/510

(58) Field of Classification Search ................. 95/268, 95/287; 55/466, 510, 498, 482, 502, 321, 55/337, 346, 347, 348, 349, 385.3, 478, 485

See application file for complete search history.

(56) References Cited

U.S. PATENT DOCUMENTS 2,853,153 A * 9/1958 Sexton ........................... 96/31
2003/0217534 A1 * 11/2003 Krisko et al. ................. 55/337

FOREIGN PATENT DOCUMENTS

DE          79 02 819          2/1979

\* cited by examiner

*Primary Examiner*—Robert A. Hopkins
(74) *Attorney, Agent, or Firm*—Crowell & Moring LLP (57) ABSTRACT

A filter system for filtering intake air for a combustion engine, in particular an air filter for a commercial vehicle, having a tubular housing, an inlet situated in the housing through which unfiltered air to be cleaned can be supplied, an outlet situated in the housing through which cleaned air can be discharged, an arrangement of filters situated in the housing between the inlet and outlet which form a seal such that air from the inlet must flow through the filter arrangement to reach the outlet, the housing having an opening for replacement of the filter which can be closed and sealed by a housing cover, and in which at least one prefilter, one main filter and one secondary filter are situated in the housing in axial succession one after the other in the direction of air flow through the filter system.

16 Claims, 5 Drawing Sheets

AIR FILTER SYSTEM

BACKGROUND OF THE INVENTION

The invention relates to an air filter system, particularly for commercial vehicles. In addition, this invention also relates to a main filter element and a secondary filter element for use in the air filter system of the invention and to a method of purifying intake air using the air filter system according to the invention.

The air filter systems known in the prior art for internal combustion engines are mounted mainly near the engine, usually in the engine compartment. However, it is becoming increasingly more difficult to install the air filter system in this area because the installation space available for this purpose is becoming smaller and smaller. In particular in commercial vehicles, especially in tractors, the available space is very limited due to the extra functional elements such as hydraulic and pneumatic elements installed in the engine compartment, and access to these systems is often hindered due to an air filter system located in the engine compartment near the engine. In addition, the intake point is often located in the dirty area of the vehicle, i.e., resulting in an elevated particle burden on the air filter and thereby reducing the lifetime of the air filter.

In this regard, German Utility Model No. 79 02 819 describes a proposed intake air purifying element as an external element for mounting on the body of a truck, whereby the element contains a prefilter and a water separator, a cyclone and air filter. However, this design is limited individually to the body of the various trucks and is thus greatly restricted with regard to free placement and in many cases, e.g., in agricultural machines with their special bodies cannot be used at all.

SUMMARY OF THE INVENTION

It is the object of the present invention to provide an improved filter system.

Another object of the invention is to provide a filter system which avoids or overcomes the aforementioned disadvantages.

A further object is to provide a filter system which is particularly suitable for filtering the intake air of an internal combustion engine, especially the engine of a commercial vehicle.

An additional object is to provide a filter system which can be installed and used universally.

A still further object of the invention is to provide a filter system that is simple to manufacture.

Yet another object of the invention is to provide a filter system which permits a great variety in installation It is also an object of the invention to provide a filter system which permits a very good separation efficiency.

These and other objects are achieved in accordance with the present invention by providing an air filter system for filtering a flow of intake air for a combustion engine, the filter system comprising a tubular housing having an inlet arranged in the housing for introducing unfiltered air to be cleaned by filtration, an outlet arranged in the housing for discharging clean filtered air, and an opening for changing the filter; a cover for closing the filter changing opening; and a filter arrangement between the inlet and the outlet such that air from the inlet must pass in a direction of flow through the filter arrangement to reach the outlet; wherein the filter arrangement comprises at least one prefilter, one main filter and one secondary filter arranged in axial succession in the direction of flow in the housing.

In accordance with a further aspect of the invention, the objects are achieved by providing a main filter element for a filter system as describe above, in which the main filter element is an annular filter element with a first end disk in the direction of flow which is closed and which carries an axially extending handle, and with a second end disk having a radially acting resilient gasket in a circumferential groove for sealingly contacting a radial sealing surface on the connecting element in the housing.

In yet another aspect, the objects are achieved by providing a secondary filter element for a filter system as described above, in which the secondary filter element is an annular filter element with a first end disk in the direction of flow which carries an axially extending handle and which has a resilient radial gasket in a circumferential groove for sealingly contacting a radial sealing surface on the connecting element in the housing, and with a second end disk which is closed.

In a still further aspect, the objects are also achieved by providing a method of cleaning intake air for an internal combustion engine, the method comprising passing uncleaned air through a cyclone separator, discharging particles separated from the air in the cyclone separator through a line which extends through a filter housing without allowing the particles to enter the interior of the filter housing, subsequently passing precleaned air from the cyclone separator radially through a main filter element from the outside to the inside, thereafter passing air from the main filter element radially through a secondary filter element from the inside to the outside, and forwarding filtered clean air from the secondary filter element to the engine; in which the secondary filter element is connected axially to the main filter element, has a closed second end disk in the direction of flow, and captures any large particles remaining in the air which has passed through the cyclone and main filter.

The inventive filter system for filtering intake air of an engine, especially air filters for a commercial vehicle, has an essentially tubular housing. The cross-sectional shape may be round, oval, angular or box-shaped. Only the elongated tubular housing shape is essential. Arranged at one end of the housing is an inlet through which the fluid to be purified, in particular unfiltered, can be supplied, and an outlet through which the purified fluid can be removed being situated at the other end of the housing. An arrangement of filters is provided with a seal between the inlet and outlet, whereby the housing has an opening that can be sealed tightly with a housing cover for replacing filters. Inside the tubular housing there are at least a prefilter, a main filter and a secondary filter connected thereto and arranged in series in the direction of flow. These filters are preferably situated axially one after the other in the tubular housing, so that the diameter of the housing can be kept low because the various filters have the flow passing through them in series one after the other and the elements are not arranged one inside the other, which would result in a larger cross section. However, when there is a larger available installation space, a concentric arrangement of at least two filter elements one inside the other is also possible. The slender tubular design yields the great advantage of variability in the installation situation, i.e., this air filter system can be used in any position and in any location corresponding to the internal combustion engine. The combination of prefilter, main filter and secondary filter yields a very high separation efficiency while at the same time protecting against increased engine wear due to a solid particle burden under a wide variety of use conditions. Another example of the successful variability of this system is manifested in the fact that the arrangement of inlet and outlet can be made as a function of the ambient requirements. For example, the inlet can be situated either on the end face or the housing or preferably laterally in the upper part of the housing, with the outlet preferably being situated on the opposite end face, but also it can be arranged with no problem laterally in the area of the opposing end face. In its shape, the housing cover preferably conforms to the outer shape of the housing, thus creating a homogeneous and visually attractive view of the filter system and offering the additional advantage of a lower susceptibility to dust because there are no protruding edges, corners or creases. The housing cover may essentially cover the entire length of the tubular housing, but preferably it closes only one opening of the size of the main filter in the approximate center of the tubular housing, whereby then with the main filter removed, there is the possibility of changing another filter through the same opening.

According to a preferred embodiment of this invention, the prefilter is characterized in that it is composed of at least two parallel cyclone separators; it is preferable here to start with a cyclone block with many cyclone cells connected in parallel. In this constellation the main filter and secondary filter are designed as round filter elements, with the first end disk of the main filter being sealed in the direction of flow and having a handle for handling the main filter and the second end disk of the secondary filter in the direction of flow, i.e., the end disk facing the outlet, is also sealed. Especially in this arrangement, the secondary element is not arranged in the interior of the main filter as is usual but instead it is spatially connected to the main filter and therefore it is installed in a direction opposite the usual direction of installation.

In an advantageous manner, the main filter and secondary filter are arranged in the housing so that the intake air prepurified by the prefilter flows through the main filter element from the outside to the inside, and then flows through the secondary filter downstream therefrom from the inside to the outside. Since the second end disk of the secondary filter in the direction of flow is sealed, a type of safety pocket is formed in the interior of the secondary filter, thereby ensuring that even if the prefilter and main filter fail, no solid particles or particles of dirt can reach the engine through the remaining intake tract and possibly damage it. In contrast with that, the secondary elements from the prior art as well as the main filter element have the air passing through them from the outside to the inside and therefore cannot offer this additional safety function.

An advantageous embodiment of the inventive idea includes the fact that the main filter is situated essentially at the axial center of the tubular housing and the secondary filter is arranged to be concentric with the main filter, following the latter in the direction of flow. Therefore an annular connecting profile is provided in the housing between the two filters for connecting the two filters. This annular connecting profile is preferably fixedly connected to the housing and serves first to secure the position of the main filter and the secondary element and ensures a reliable seal between the unfiltered side and the clean air side.

According to another modification of this invention, the annular connecting profile has sealing surfaces for radially sealing the main filter and secondary filter to separate the clean air side from the unfiltered side and has axial stop surfaces for securing the axial end position of the main filter and the secondary filter. The annular connecting profile has essentially a U-shaped cross-sectional profile, with the inner axial leg of the U-shape being longer than the outer axial leg, and with the inner axial leg having a peripheral edge that protrudes inward on the inside surface. This edge serves as an axial stop for the upper annular end disk of the secondary element and the peripheral surface situated above the peripheral edge together with the end disk of the secondary element accordingly ensures a radial seal between the unfiltered side and the clean air side. The area of the annular connecting profile situated between the two U-shaped legs provides an axial stop for the annular second disk of the main filter element in the direction of flow, and the interior surface of the second U-shaped leg of the connecting profile serves to provide a radial seal for the main filter element between the unfiltered side and the clean air side. Thus the main filter element and the secondary filter element are joined together with a seal via the annular connecting profile and the filters are thereby centered in the housing and secured in their axial position.

According to another advantageous embodiment of this invention, a channel which is separated from the remainder of the interior volume of the housing with a seal is situated in the interior of the housing, following, downstream from the at least two parallel cyclones which serve as prefilters, whereby the channel is connected to a vacuum source accordingly, following the housing in order to discharge the solid particles deposited by the cyclones. Since the cyclones as prefilters have a very high separation efficiency, it is necessary to ensure that the solid particles are discharged continuously through the cyclone so as not to result in blockage of the system. The discharged dust and solid particle fraction should not come in contact with the main filter or secondary filter which follow in the direction of flow because that would drastically reduce their respective lifetimes. The dust outlet from the cyclones is preferably connected to flexible tubing which is passed through the housing of the air filter system and is also brought out of the housing next to the outlet of the air filter housing. To ensure that all dust and solid particles are removed, the tubing is then connected to a vacuum source or, for example, to the exhaust system, with the vacuum then being generated by a Venturi principle. However, it is also possible to integrate a separate solids channel into the housing so that the collected dust and solid particles of the cyclones can be discharged through it. It is necessary only to ensure complete separation of the cyclone solids discharge from the downstream filter elements.

In a special embodiment, the housing cover has means for securing its position, in particular an inward concavity on the housing cover which extends radially inward on at least one filter element, so that improper installation of the at least one filter element and any change in position of the filter element during operation are prevented. This makes it easy to verify the correct installation of the secondary element and the main filter element. First, the secondary filter element is passed through the connecting profile, where it comes to rest against an axial stop and in the next step the main filter element is also placed on the connecting profile. If the secondary filter element is improperly installed, it is impossible to insert the main filter element into the proper position. The main filter element therefore does not reach its axial end stop in the housing and thus deviates from its specified final position. Then when the housing cover is assembled thereon, the inward concavity in the housing, which extends toward the inside, does not allow the housing to be closed against the upper part of the main filter element and the housing. It is thus easily possible to ascertain whether the secondary filter element and the main filter element have been inserted satisfactorily. If the filter elements have been inserted satisfactorily, the housing cover concavity protrudes into the interior of the filter housing when the housing cover is closed and thus forms an upper axial end stop for the end disk of the main filter element which is provided with the handle element. Depending on the design of the two parts in relation to one another, either the end disk and the housing cover concavity come into contact or there remains a slight air gap between the two parts. Thus with the cover closed it is possible to prevent even the vibration-induced migration of the main filter element out of the predetermined position, especially for use in the agricultural field where severe vibration and external mechanical influences exist. Optionally there is additionally the possibility of securing the main filter element in the upper area of the end disk with a suitable device in the housing via a snap connection, for example.

A special embodiment of the filter system consists of the fact that the inlet has an inlet opening the size of which can be varied, whereby the separation efficiency of the prefilter is adapted to the size of the inlet opening. On the basis of the different dust and dirt burdens with different types of use of commercial vehicles, in particular agricultural vehicles, it is advantageous to adjust the separation efficiency of the prefilter (in particular the cyclone block) to the different separation needs. This is accomplished most easily by reducing or increasing the number of individual cyclones in the cyclone block. To simplify the filter system and for inexpensive manufacturing, the inlet opening which is provided in the housing preferably remains constant and thus an inlet opening the size of which is variable can be achieved by way of an insert that can be inserted into the inlet opening. The portion of the flow-through volume that is not required is simply covered with the insert so that only the required opening for the cyclones used remains passable to air.

According to another embodiment of this invention, means for accommodating function elements are provided on the housing, with means for optional electrification through a current source situated outside of the housing being situated in the interior of the housing. By creating suitable connections, e.g., flange connections or screw receptacles on the housing, it is possible to detachably connect certain function elements to the outer part of the housing. If these function elements must be supplied with electric power to perform their function, this electric power is supplied through the power lines including plugs which are installed in the interior of the housing in such a way that they are separated from the remainder of the interior volume. Likewise, it is also conceivable to provide small switch relays or control units for triggering the function elements in the housing. In addition, it is readily possible to install fiberglass cables for data transmission and signal transmission to the function elements. For example, an empty tube with appropriate connection points to the function elements or a channel fixedly integrated into the housing are possible for this purpose.

According to a special embodiment of this expansion of the filter system, the function elements include technical lighting systems and/or a rearview mirror. Thus for example a flashing light, the low beam light and/or parking light of an agricultural vehicle may be mounted on the housing, or it is likewise possible to mount and arrange a rear mirror, which is additionally heated or electrically adjustable, for example, on the housing either individually or in addition.

According to an advantageous embodiment of this invention, the housing is made of centrifugally cast plastic. It is thus possible in a simple and advantageous manner to manufacture a large tubular housing, whereby the weight nevertheless remains low, and the die-casting mold may be designed freely for the most part. By integration of special bushings and nuts in the manufacturing process, it is easy to implement the connection of the function elements and/or the housing cover.

According to an alternative embodiment of the filter system, the housing is formed mainly by the A pillar of a motor vehicle, in particular a commercial vehicle, preferably an agricultural vehicle. Especially in the case of large commercial vehicles and/or agricultural vehicles, available space in the "engine compartment" is very low, so that alternatives for mounting the air filter system are needed. Due to the fact that the filters including the prefilters are arranged in-line, i.e., one after the other and therefore the diameter of the tubular housing need not be excessively large, the system can be integrated into the A pillar of many vehicles. The A pillar itself may assume a large portion of the housing function, with the complementation being implemented via housing half-shells and housing covers.

Likewise, it is alternatively possible with this concept to design the housing mainly through the body parts and/or frame parts of a motor vehicle. Since the spatial position of the filter system has no influence on the separation efficiency and thus all positions are possible from an upright arrangement to a horizontal arrangement, it is therefore also possible to integrate the filter system into a roof bar, fender parts or frame parts of the frame of a motor vehicle, for example. To save on material and space, the body and/or frame parts then also assume housing functions, so that then only a few additional housing parts are needed to create a tight but nevertheless externally accessible filter system.

In addition, it is possible to design the housing of the filter system as an external free-standing or horizontal element mountable freely on the body of a motor vehicle or on the internal combustion engine of same. Therefore, the air filter system can be installed in a free-standing mount, preferably near the engine, e.g., in an agricultural vehicle, independently of external factors determined by the cab of a motor vehicle for example. With the possibility of mounting function elements such as technical lighting systems and/or rear view mirrors on the air filter system, additional advantageous functions can be integrated into the air filter system. For example, the air filter system is mounted as an upright column in mirror image to the exhaust system of the vehicle in an agricultural commercial vehicle, ensuring a very good accessibility of the filter elements and an air intake with a low particulate burden.

An advantageous design of the idea of this invention includes a special embodiment of the main filter element for use in the air filter system described above. Accordingly, the main filter element is a round filter element, whereby the first end disk in the direction of flow is sealed and has a handle element extending axially while the second end disk has an elastic gasket acting radially in a peripheral groove which is in sealing contact accordingly with a radial sealing surface of the connecting element in the housing of the filter system. The main filter element has air flowing through it from the outside to inside, which is why the first end disk is tightly sealed and the second end disk is designed as a hollow cylinder and ensures a seal between the unfiltered side and the clean air side. The handle element may preferably have an M-shaped cross section, but other cross-sectional shapes are quite acceptable and feasible. The elastic gasket acting radially in the peripheral groove of the second end disk may have any shape known from the prior art, with O-rings, integrally molded sealing material or a polyurethane foam to be mentioned as possible examples.

According to one further embodiment of the main filter element, the filter medium is a zigzag pleated filter paper medium and the end disks are made of a thermoplastic plastic such as polyamide or polypropylene, and the radial gasket has a T-shaped cross section. The base of the T here protrudes radially outward and forms a type of sealing lip comparable to a windshield wiper lip.

The secondary filter element for a filter system as described above is also a round filter element, whereby the first disk in the direction of flow has an axially extending handle element and the second end disk is sealed. In the first hollow cylindrical end disk, a radially acting elastic gasket is provided in a peripheral groove and forms a sealing contact accordingly with a radial sealing face of the connecting element in the housing of the filter system. The handle element extending axially is preferably in the form of a collar provided with passages through it, with the peripheral groove being situated in the lower part of the collar. The gasket which is mounted in the peripheral groove may have any shape known in the prior art, e.g., it may be an O-ring or an injected ring or a polyurethane foam gasket.

According to one embodiment of the secondary element, the filter medium of the secondary filter element is a filter nonwoven and the end disks are made of thermoplastic plastic, e.g., polyamide or polypropylene. Here again the radial gasket, as in the main filter element, preferably has a T-shaped cross section, with the lip that points outward radially being designed in the manner of a windshield wiper. The lower portion of the peripheral grooves has a peripheral edge protruding outward which sits in the connecting profile to establish an axial stop. The inventive method for purifying intake air for an internal combustion engine having a filter system as described above comprises the following steps. Unpurified intake air is first drawn through a cyclone separator with the preliminary separation taking place here. Rotation is induced in the intake air in the cyclones, and the solid particles are separated from the intake air by centrifugal force. The particles separated from the air are then discharged through a line which runs through the tubular filter housing downstream from the cyclone separator. This line is connected to a vacuum source, e.g., the exhaust system via a Venturi nozzle so that solid particles are completely removed. Since the solid particles do not come in contact with the downstream filters, the line through which the solid particles are discharged is separated from the remainder of the interior volume of the tubular housing. Downstream from the cyclones, the prepurified air passes through the main filter element from the outside to the inside and then flows through the axially downstream secondary filter element from the inside to the outside. Downstream from the secondary filter element, the intake air which is then completely purified, is sent to the internal combustion engine. In an advantageous manner the secondary filter element is sealed with the end disk which is the second in the directional flow and is thus able to capture any solid particles or other particles that might still be present. Another advantage of this arrangement is that when changing the main filter element, the secondary filter element would catch any screws or the like that might fall down into the system when making the change and therefore it protects the engine from damage.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWING

The invention will be described in further detail hereinafter with reference to illustrative preferred embodiments shown in the accompanying drawings, in which.

BRIEF DESCRIPTION OF THE DRAWINGS

Figure 1:
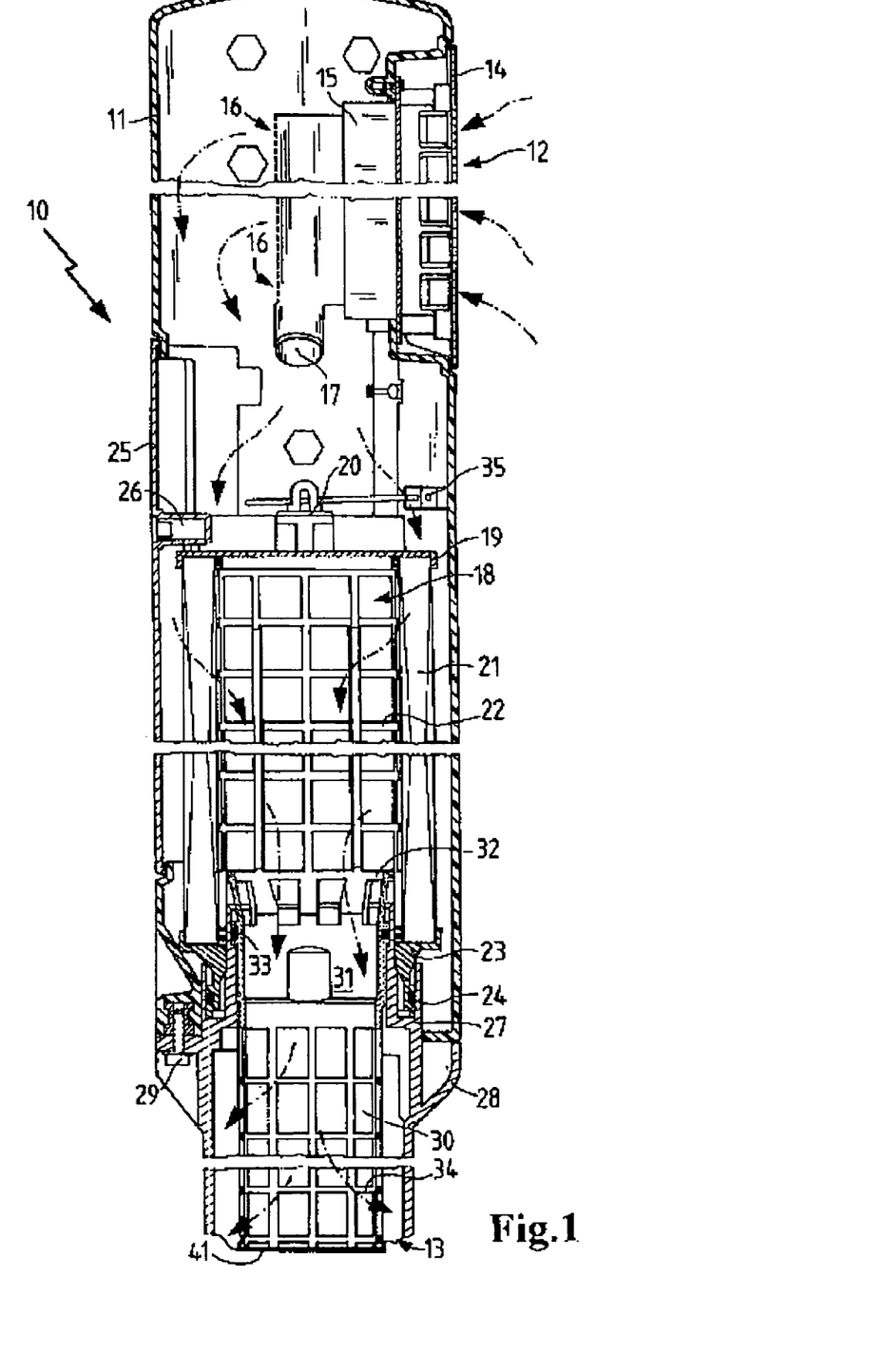
FIG. 1 shows a sectional view through an air filter system according to the invention.

FIG. 1 shows the inventive air filter 10 with a housing 11, which has an inlet 12 and an outlet 13. The outlet 13 is, in addition, connected to the intake system of the internal combustion engine (not shown further here). The inlet 12 has an inlet cover 14, e.g., in the form of a mesh structure and air flows directly into a cyclone block 15 according to the direction of the arrow. The cyclone block 15 has an air outlet 16 for the air which has passed through the cyclone block 15 and is now purified, as well as having a dust discharge opening 17. The remaining course of the discharge of dust downstream from the dust discharge opening 17 is described in greater detail in conjunction with FIG. 2 and is not discussed further here in conjunction with FIG. 1.

Downstream from the air outlet 16, the air flows from the outside to the inside through the main filter 18, which has a first end disk 19, with a handle element 20 formed axially in one piece with the first end disk 19. A hollow cylindrical filter medium 21 is connected to the first end disk 19 and supported by a supporting tube 22 on the inside.

The filter medium 21 and supporting tube 22 are in turn connected to a second end disk 23 downward in the direction of flow. This end disk has a radial gasket 24. Installation of the main filter 18 in the correct position can be detected when locking a housing cover 25 because only if the installation is in the proper position can an axial stop element 26 on the housing cover 25 above the first end disk 19 protrude radially into the housing.

The main filter element 18 is inserted into the air filter 10 via a connecting profile 27 with a flange 28, which is in turn connected by a screw connection 29 to the housing 11, so that it is centered and stopped axially by the connecting profile 27. The radial gasket 24 seals the main filter element 18 with respect to the connecting profile 27. In the remaining course, the flange 28 is connected to the intake system (not shown further here) of the internal combustion engine. A secondary element 30 is provided downstream from the main filter 18 and has a first end disk 31 from which there extends a collar 32 axially in the direction of the main filter element 18 and which has a radial gasket 33.

The secondary element 30 also has a supporting tube 34 on the inside and is sealed with a closed end disk 41. With the radial gasket 33, the secondary element 30 also forms a tight connection with the connecting profile 27. After installation of secondary element 30 and main filter element 18, they can be locked in the housing 11 by a clip connection 35.

Figure 2:
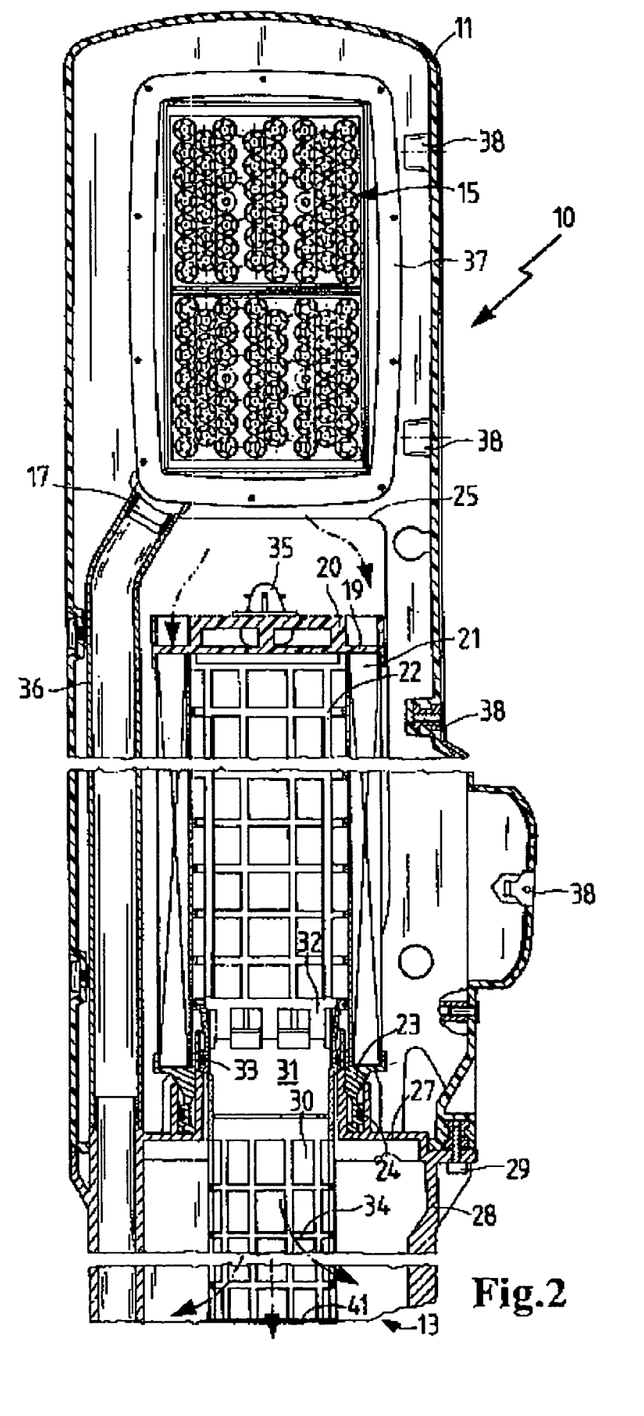
FIG. 2 also shows another sectional view through the inventive air filter system.

FIG. 2 shows another sectional diagram of the inventive filter system. The components corresponding to FIG. 1 are labeled with the same reference numbers. This figure shows clearly the channel 36 for discharge of the dust and solid particles separated from the air out of the cylinder block, which is connected to an external vacuum source. It can be seen that the separated dust and solid particles are completely separated from the remaining interior of the housing 11 by the channel 36. This view also shows a fastening flange 37 for attaching the inlet cover 14. The function elements not shown here, such as lighting systems and/or mirrors, are mounted at mounting points 38 which are distributed over the housing 11. The cabling for electrification and any switch units or controllers are then provided within the housing 11.

Figure 3:
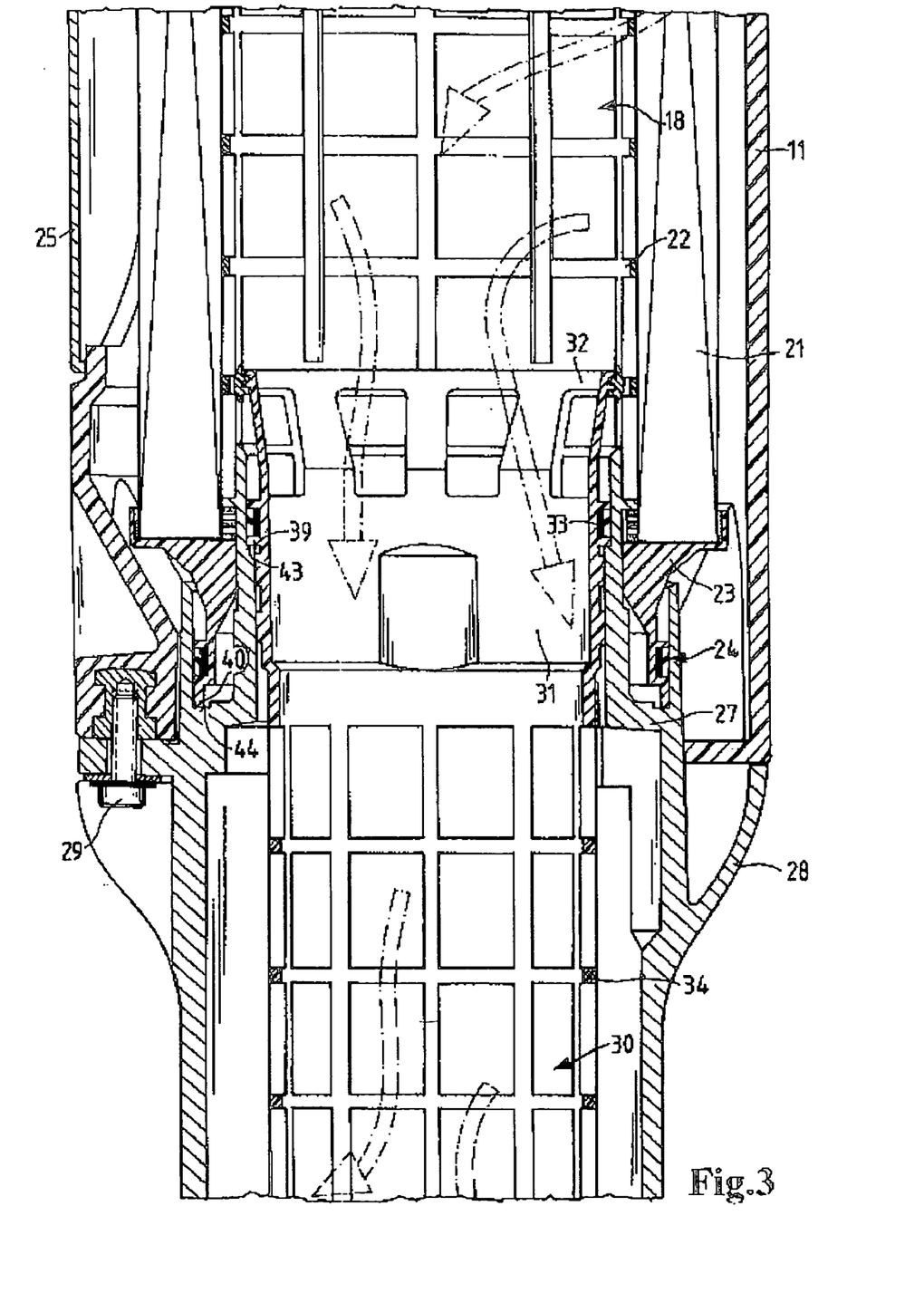
FIG. 3 shows an enlargement of the connecting point between the main filter element and the secondary filter element.

FIG. 3 shows an enlargement of the connecting area between the main filter element 18 and the secondary filter element 30 in cross section. Parts corresponding to those in FIGS. 1 and 2 are labeled with the same reference numbers. The enlargement shows clearly the guidance and support of the main filter 18 and the secondary element 30 through the connecting profile 27.

During assembly, the secondary element 30 is inserted first into the concentric opening in the connecting profile 27, whereby the radial gasket 33, which is integrated into the collar 32 of the secondary element 30, is in sealing contact with an axial wall of the connecting profile 27 in the end area. An axial stop edge 43 is situated in the axial wall of the connecting profile 27, an axial stop 39 of the secondary element 30 being in contact with this stop edge in the end position, thereby defining the axial end position.

Then the main filter element 18 is introduced into the housing 11 of the air filter 10, whereby an initial guidance and centering of the main filter element 18 are accomplished due to the collar 32 of the secondary filter element 30, the collar becoming wider toward the top. The main filter element 18 is pushed over the collar 32, whereupon the radial gasket 24 of the end disk 23 of the main filter element 18 is in sealing contact with another axial wall of the connecting profile 27. Here again, the connecting profile 27 has an axial stop edge 44 which ensures an axial definition of the end position in conjunction with the axial end stop 40 of the main filter element 18.

Figure 4:
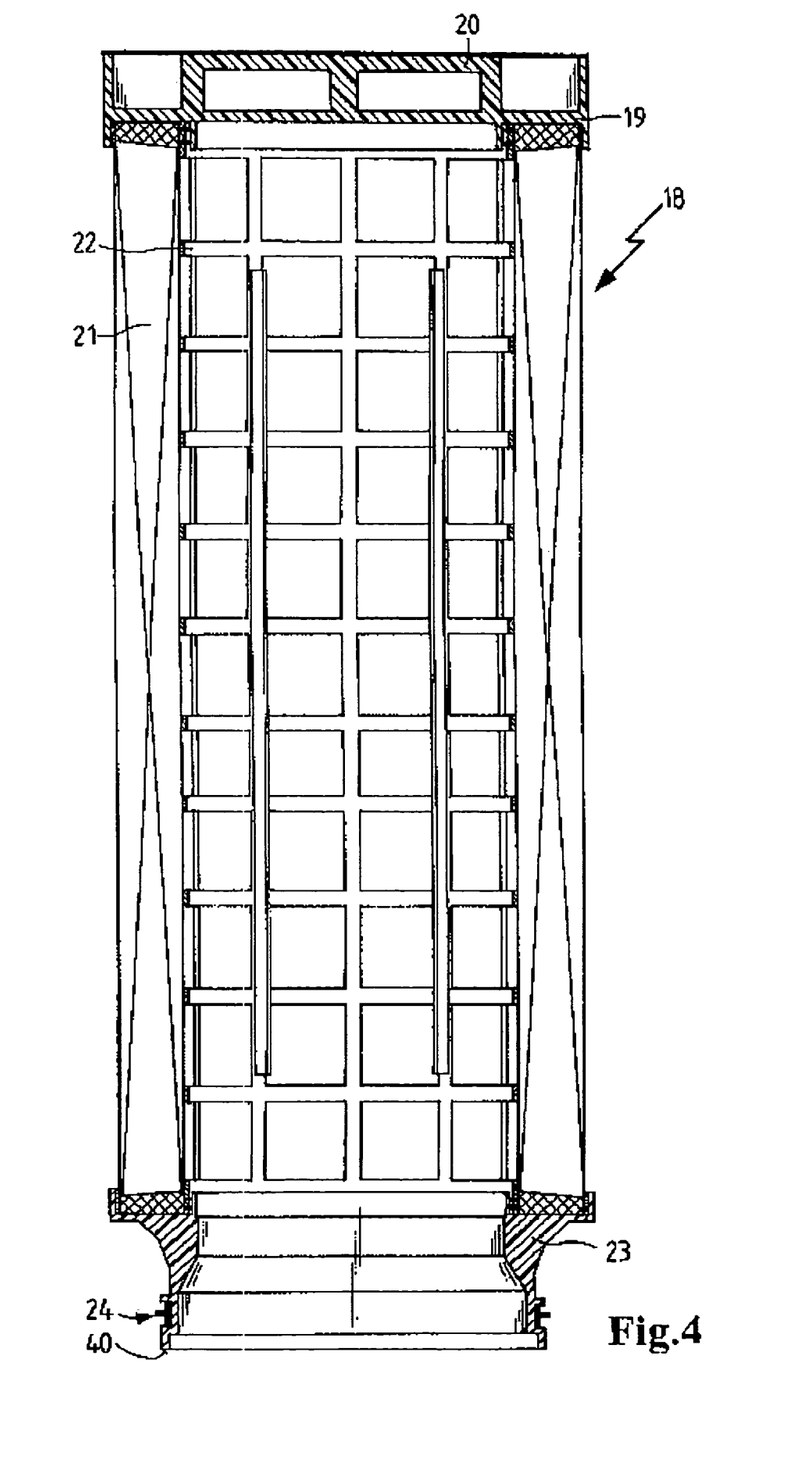
FIG. 4 shows the main filter element in a sectional view.

FIG. 4 shows a sectional diagram of the main filter element 18. The parts corresponding to the previous figures are labeled with the same reference numbers. The main filter element 18 has a zigzag pleated paper filter medium 21 which is supported by a supporting tube 22 situated in the interior. The end faces of the filter medium 21 are sealed off with end disks 19 and 23. The first closed end disk 19 has a handle element 20 which extends axially upward but does not protrude radially beyond the projected area of the filter element 18. The end disk 19 is connected in one piece to the handle element 20 and is inseparably connected to the filter medium 21 and the supporting tube 22. This may be accomplished by welding or gluing, for example.

The second hollow cylindrical end disk 23 which is also inseparably connected to the filter medium 21 and the supporting tube 22 has an axial end stop 40 which is used in combination with the connecting profile 27 for fixing the position of the main filter element 18. In the area of the end stop 40, the end disk 23 has a peripheral groove with a gasket 24 inserted into it. The gasket has a T-shaped cross section, is manufactured in one piece of a flexible elastic plastic and the effective area of the radial gasket is to be compared in its function to a windshield wiper lip.

Figure 5:
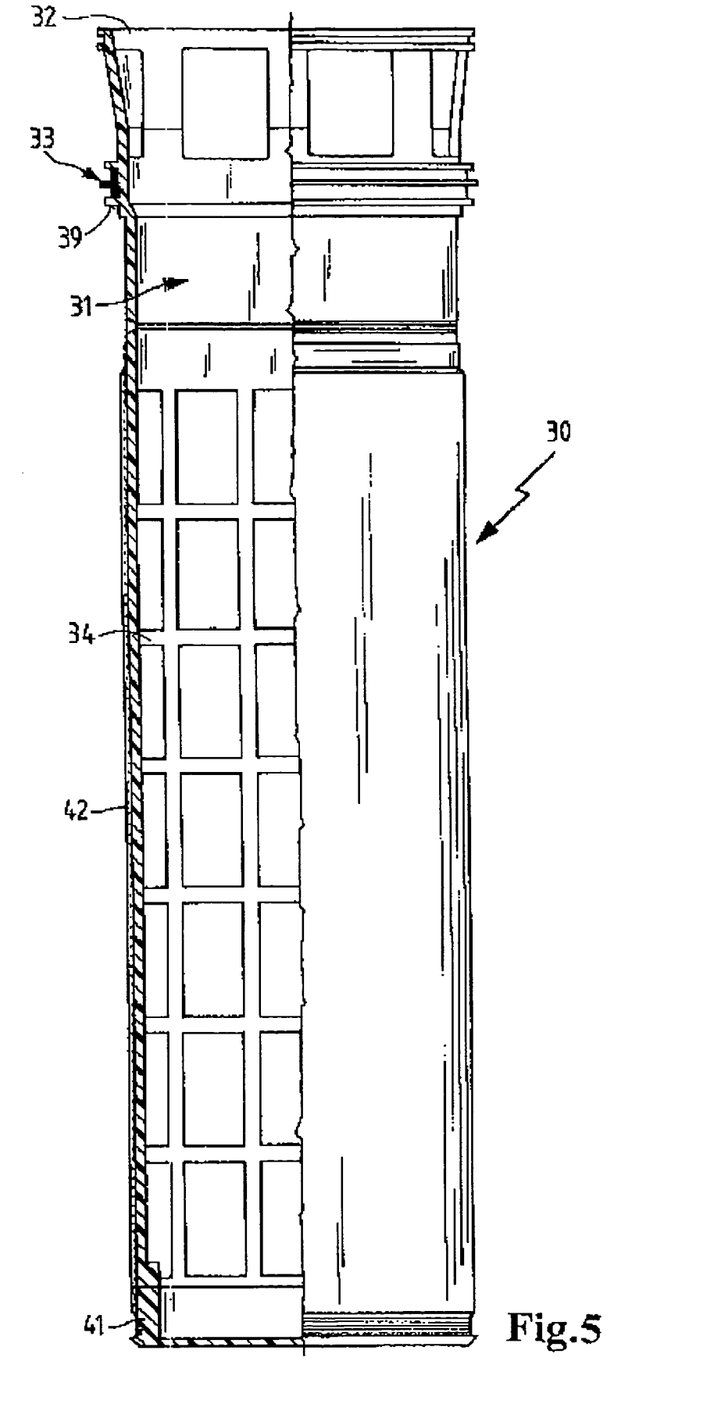
FIG. 5 shows a section through the secondary filter element.

FIG. 5 shows a sectional view of the secondary element 30. The parts corresponding to those in previous figures are labeled with the same reference numbers. The secondary element 30 has as the filter medium a filter nonwoven 42 which is supported by a supporting tube 34 on the inside. The one end of the secondary filter element 30 is tightly sealed with an end disk 41. The other end face of the secondary filter element 30 has a hollow cylindrical end disk 31 with a collar 32 extending upward. The collar is interrupted by several passages so that it can also assume a handle function.

In the middle area of the end disk 31 there is a peripheral or circumferential groove which accommodates a radial gasket 33. The radial gasket 33 has a T-shaped cross section, with the sealing effect being achieved via the windshield wiper-like lip. The lower edge 39 of the peripheral groove serves as an axial stop for the secondary element on insertion into the connecting profile 27. This edge 39 is fully in contact with the axial stop edge 43 of the connecting profile 27 after the secondary element has been inserted correctly (see FIG. 3).

The metal-free main filter element and the secondary filter element, which is also metal-free, can be disposed of with no problem. The filter paper, the nonwoven, the central plastic tube and the handle as well as the plastic end disks can be disposed of thermally very easily. Due to the special shaping of the end disks of the two filter elements, they can be combined together easily and placed in operating position via the connecting profile of the housing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter system for filtering a flow of intake air for a combustion engine, said filter system comprising:
    a tubular housing having an inlet arranged in the housing for introducing unfiltered air to be cleaned by filtration, an outlet arranged in the housing for discharging clean filtered air, and an opening for changing the filter;
    a cover for closing the filter changing opening; and
    a filter arrangement between the inlet and the outlet such that air from the inlet must pass in a direction of flow through the filter arrangement to reach the outlet;
    wherein said filter arrangement comprises at least one prefilter, one main filter and one secondary filter arranged in axial succession in the direction of flow in the housing, and
    wherein the prefilter comprises at least two parallel cyclone separators, the main filter is an annular filter element, and the secondary filter is also an annular filter element, and wherein the main filter has a first end disk in the direction of flow which is closed and carries a handle, and the secondary filter has a second end disk in the direction of flow which is closed.

2. A filter system according to claim 1, wherein the flow of air passes through the main filter element from the outside to the inside, and, downstream from the main filter, the flow of air passes through the secondary filter from the inside to the outside.

3. A filter system according to claim 1, wherein the main filter is arranged substantially at the axial center of the tubular housing, and the secondary filter is disposed on the main filter downstream from the main filter in the direction of flow so as to be coaxial with the main filter, and wherein an annular connecting profile is provided in the housing between main filter and the secondary filter for connecting the two filters.

4. A filter system according to claim 3, wherein the annular connecting profile has radial sealing surfaces and axial stop surfaces, said radial sealing surfaces sealing the main filter and the secondary filter for separating a clean air side from an unfiltered air side, and said axial stop surfaces defining final axial positions of the main filter and the secondary filter.

5. A filter system according to claim 1, wherein downstream from the at least two parallel cyclones in the interior of the housing a channel is situated which is sealed off from the remainder of the interior volume of the housing, said channel being connected to a vacuum source downstream from the housing in order to discharge solid particles separated by the cyclone.

6. A filter system according to claim 1, wherein said cover includes position fixing means for preventing improper installation of at least one filter element and changes in position of said at least one filter element during operation.

7. A filter system according to claim 6, wherein said position fixing means comprises a radially inwardly extending curved portion on said cover.

8. A filter system for filtering a flow of intake air for a combustion engine, said filter system comprising:
   a tubular housing having an inlet arranged in the housing for introducing unfiltered air to be cleaned by filtration, an outlet arranged in the housing for discharging clean filtered air, and an opening for changing the filter;
   a cover for closing the filter changing opening; and
   a filter arrangement between the inlet and the outlet such that air from the inlet must pass in a direction of flow through the filter arrangement to reach the outlet;
   wherein said filter arrangement comprises at least one prefilter, one main filter and one secondary filter arranged in axial succession in the direction of flow in the housing, and
   wherein said housing further comprises means for accommodating functional elements, and means are provided in the interior of the housing for optionally supplying electrical power to said functional elements from an electrical power source arranged outside the housing.

9. A filter system according to claim 8, wherein said functional elements comprise a lighting device or a rear view mirror.

10. A filter system according to claim 8, wherein the housing is made of centrifugally cast synthetic resin material.

11. A filter system according to claim 8, wherein the housing is constructed as an external free-standing or horizontal element freely mountable on a motor vehicle body or on an internal combustion engine of a motor vehicle.

12. A main filter element for a filter system,
   said filter system comprising a tubular housing having an inlet arranged in the housing for introducing unfiltered air to be cleaned by filtration, an outlet arranged in the housing for discharging clean filtered air, an opening for changing the filter, a cover for closing the filter changing opening, and a filter arrangement comprising at least one prefilter, one main filter and one secondary filter arranged in axial succession between the inlet and the outlet such that air from the inlet must pass in a direction of flow through the filter arrangement to reach the outlet;
   wherein said main filter element is an annular filter element with a first end disk in the direction of flow which is closed and which carries an axially extending handle, and with a second end disk having a radially acting resilient gasket in a circumferential groove for sealingly contacting a radial sealing surface on a connecting element in the housing.

13. A main filter element according to claim 12, wherein said filter element comprises a filter medium made of zig-zag folded pleated filter; the end disks are made of a thermoplastic synthetic resin material, and the radially acting gasket has a T-shaped cross section.

14. A secondary filter element for a filter system,
   said filter system comprising a tubular housing having an inlet arranged in the housing for introducing unfiltered air to be cleaned by filtration, an outlet arranged in the housing for discharging clean filtered air, an opening for changing the filter, a cover for closing the filter changing opening, and a filter arrangement comprising at least one prefilter, one main filter and one secondary filter arranged in axial succession between the inlet and the outlet such that air from the inlet must pass in a direction of flow through the filter arrangement to reach the outlet;
   wherein said secondary filter element is an annular filter element with a first end disk in the direction of flow which carries an axially extending handle and which has a resilient radial gasket in a circumferential groove for sealingly contacting a radial sealing surface on a connecting element in the housing, and with a second end disk which is closed.

15. A secondary filter element according to claim 14, wherein said filter element comprises a filter medium made of non-woven fibers; the end disks are made of a thermoplastic synthetic resin material, and wherein the radial gasket has a T-shaped cross section.

16. A method of cleaning intake air for an internal combustion engine, said method comprising:
   passing uncleaned air through a cyclone separator,
   discharging particles separated from the air in the cyclone separator through a line which extends through a filter housing without allowing the particles to enter the interior of the filter housing,
   subsequently passing precleaned air from the cyclone separator radially through a main filter element from the outside to the inside,
   thereafter passing air from the main filter element radially through a secondary filter element from the inside to the outside, and
   forwarding filtered clean air from the secondary filter element to the engine;
wherein said secondary filter element is connected axially to said main filter element, has a closed second end disk in the direction of flow, and captures any large particles remaining in the air which has passed through the cyclone and main filter.

* * * * *